(12) United States Patent
Bassin et al.

(10) Patent No.: US 7,669,180 B2
(45) Date of Patent: Feb. 23, 2010

(54) METHOD AND APPARATUS FOR AUTOMATED RISK ASSESSMENT IN SOFTWARE PROJECTS

(75) Inventors: Kathryn Bassin, Harpursville, NY (US); Robert M. Delmonico, White Plains, NY (US); Tamir Klinger, New York, NY (US); Theresa Kratschmer, Yorktown Heights, NY (US); Bonnie Ray, South Nyack, NY (US); Padmanabhan Santhanam, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 981 days.

(21) Appl. No.: 10/872,282

(22) Filed: Jun. 18, 2004

(65) Prior Publication Data

US 2005/0283751 A1 Dec. 22, 2005

(51) Int. Cl.
G06F 9/44 (2006.01)
G06F 11/00 (2006.01)

(52) U.S. Cl. .......................... 717/101; 717/125; 714/57
(58) Field of Classification Search ........................ None
See application file for complete search history.

(56) References Cited

U.S. PATENT DOCUMENTS 5,771,179 A * 6/1998 White et al. ................ 702/183

| | | | |
|---|---|---|---|
| 6,219,805 B1 | 4/2001 | Jones et al. | 714/38 |
| 6,397,202 B1 * | 5/2002 | Higgins et al. | 706/47 |
| 6,675,127 B2 * | 1/2004 | LaBlanc et al. | 702/181 |
| 2003/0033191 A1 * | 2/2003 | Davies et al. | 705/10 |
| 2005/0065753 A1 * | 3/2005 | Bigus et al. | 702/186 |
| 2005/0283751 A1 * | 12/2005 | Bassin et al. | 717/100 |

OTHER PUBLICATIONS

Chen, Y., Probert, R. L., and Sims, D. P. 2002. Specification-based regression test selection with risk analysis. In Proceedings of the 2002 Conference of the Centre For Advanced Studies on Collaborative Research (Toronto, Ontario, Canada, Sep. 30-Oct. 3, 2002). D. A. Stewart and J. H. Johnson, Eds. IBM Centre for Advanced Studies Conf.*

(Continued)

*Primary Examiner*—James Rutten
(74) *Attorney, Agent, or Firm*—Michael J. Buchenhorner; Douglas W. Cameron

(57) ABSTRACT

A method, information processing system and computer readable medium for assessing risk in a software development project. The method includes receiving software project data for assessing risks in a software development project and identifying a plurality of focus areas for analysis. The method further includes defining a set of analysis tasks for each focus area and creating one or more rule sets for each analysis task, each rule set comprising one or more rules including software project data. The method further includes evaluating each rule set against the software project data summarizing results of evaluating each rule set corresponding to an analysis task. The method further includes providing a risk assessment value for each analysis task using the results of the summarizing element.

30 Claims, 7 Drawing Sheets

OTHER PUBLICATIONS

M.K. Daskalantonakis, "A Practical View of Software Measurement and Implementation Experiences Within Motorola," IEEE Trans. Software Engineering, vol. 18, Nov. 11, 1992, pp. 998-1010.

G. Stark, R. C. Durst, and C. W. Vowell, "Using Metrics in Management Decision Making," Computer vol. 27, No. 9, 1994, pp. 42-48.

S. H. Kan, J. Parrish and D. Manlove, "In Process Metrics for Software Testing," IBM Systems Journal, vol. 40, Nov. 1, 2001, pp. 220-241.

K. Bassin, S. Biyani, and P. Santhanam, "Metrics to Evaluate Vendor-developed Software Based on Test Execution Results," IBM Systems Journal, vol. 41, Nov. 1, 2002, pp. 13-30.

* cited by examiner

| Focus Area | Analysis Task Definition | | |
|---|---|---|---|
| Product Stability | Defect Type vs. Time | | |
| | Severity vs. Time | | |
| | Defect Qualifer vs. Time | | |
| | Defect Type vs. Qualifier | | |
| | Intended Defect Type Signature vs. Actual Defect Type Signature | | |
| Test Effectiveness | Trigger vs. Time | | |
| | Intended Trigger Signature vs Actual Trigger Signature | | |

402  404

| Area of © Rule Set | Rule | Attribute | Unit of Measure | Time Frame | Algorithm | Condition Checked | Threshold | Associated |
|---|---|---|---|---|---|---|---|---|
| Product S | Severity over Time | 20 | Severity 1 | Count | Last fourth | Threshold | greater than | 2 | |
| | | and | (High impact Se | Percent | Last fourth | Threshold | greater than | 50 | High |
| | | 21 | Severity 1 | Count | Last fourth | Threshold | greater than | 2 | |
| | | and | (High impact Se | Percent | Last fourth | Threshold | Less than or = | 50 | Medium |
| | | 22 | Severity 1 | Count | First fourth | Threshold | greater than | 0 | Medium |
| | | and | Severity 1 | Count | Second fo | Threshold | greater than | 0 | Medium |
| | | and | Severity 1 | Count | Third fourt | Threshold | greater than | 0 | Medium |
| | | and | Severity 1 | Count | Last fourth | Threshold | greater than | 0 | Medium |
| | | 23 | Severity 2 | Percent | Last three | Trend | non-decreasing | | |
| | | and | (High Impact Se | Percent | Last fourth | Threshold | greater than | 50 | Medium |
| | | 24 | Severity 2 | Percent | Last three | Threshold | greater than | 20 | |
| | | and | (High impact Se | Percent | Last fourth | Threshold | greater than | 50 | Medium |
| | | 25 | Severity 2 | Percent | Last three | Trend | non-decreasing | | |
| | | and | (High Impact Se | Percent | Last fourth | Threshold | Less than or = | 50 | Low |
| | | 26 | Severity 2 | Percent | Last three | Threshold | greater than | 20 | |
| | | and | (High impact Se | Percent | Last fourth | Threshold | Less than | 50 | Low |
| | | 27 | Severity 3 | Percent | Last half | Trend | non-decreasing | | Informationa |
| | | 28 | Severity 3 | Percent | Last fourth | Threshold | greater than | 40 | Informationa |
| | | 29 | Severity 3 to Se | Percent | Last fourth | Comparison | greater than | | Informationa |

FIG. 6

| Focus Area | Analysis Task Definition | Risk per task | |
|---|---|---|---|
| Product Stability | Defect Type vs. Time | High | |
| | Severity vs. Time | Medium | |
| | Defect Qualifer vs. Time | Low | |
| | Defect Type vs. Qualifier | High | |
| | Intended Defect Type Signature vs. Actual Defect Type Signature | High | |
| Process Effectiveness | Trigger vs. Time | Low | |
| | Intended Trigger Signature vs Actual Trigger Signature | Medium | |

FIG. 7

| Focus Area | Analysis Task Definition | Risk per task | Risk per Focus Area |
|---|---|---|---|
| Product Stability | Defect Type vs. Time | High | High |
| | Severity vs. Time | Medium | |
| | Defect Qualifer vs. Time | Low | |
| | Defect Type vs. Qualifier | High | |
| | Intended Defect Type Signature vs. Actual Defect Type Signature | High | |
| Process Effectiveness | Trigger vs. Time | Low | Medium |
| | Intended Trigger Signature vs Actual Trigger Signature | Medium | |

FIG. 8

| Focus Area | Analysis Task Definition | Risk per task | Risk per Focus Area | Overall Risk Assessment |
|---|---|---|---|---|
| Product Stability | Defect Type vs. Time | High | High | High |
| | Severity vs. Time | Medium | | |
| | Defect Qualifer vs. Time | Low | | |
| | Defect Type vs. Qualifier | High | | |
| | Intended Defect Type Signature vs. Actual Defect Type Signature | High | | |
| Process Effectiveness | Trigger vs. Time | Low | Medium | |
| | Intended Trigger Signature vs Actual Trigger Signature | Medium | | |

FIG. 9

METHOD AND APPARATUS FOR AUTOMATED RISK ASSESSMENT IN SOFTWARE PROJECTS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of project management and more particularly relates to the field of assessing risk associated with a software development project.

BACKGROUND OF THE INVENTION

The success of a software development project depends on various factors, including timely delivery, meeting the needs of the customer, supporting the customer and providing a product of acceptable quality. Software development organizations collect a broad range of data and metrics during development, such as change requests, defect information, status of test cases, and others, to try and measure the status of the project in some fashion. Over the years, there have been a number of research efforts addressing the use of software metrics for in-process project management. Generally, this body of work focuses on specific sets of metrics to monitor various aspects of risk during the execution of a project. The metrics are evaluated one at a time using methods that may vary from individual to individual, and the overall risk of the project is evaluated subjectively from the individual metric evaluations. There is currently no systematic method to analyze software development data in an automated fashion to provide meaningful feedback about the software development process.

Therefore, a need exists to overcome the problems with the prior art as discussed above, and particularly for a way to simplify the task of providing automated risk assessments during a software development project.

SUMMARY OF THE INVENTION

Briefly, according to an embodiment of the present invention, a method for assessing risk in a software development project is disclosed. The method includes receiving software project data for assessing risks in a software development project and identifying a plurality of focus areas for analysis. The method further includes defining a set of analysis tasks for each focus area and creating one or more rule sets for each analysis task, each rule set comprising one or more rules including software project data. The method further includes evaluating each rule set against the software project data summarizing results of evaluating each rule set corresponding to an analysis task. The method further includes providing a risk assessment value for each analysis task using the results of the summarizing element.

Another embodiment comprises an information processing system for assessing risk in a software development project. The information processing system includes a memory for storing software project data for assessing risks in a software development project, a plurality of focus areas for analysis, a set of analysis tasks for each focus area and one or more rule sets for each analysis task, each rule set comprising one or more rules including software project data. The information processing system further includes a processor configured for evaluating each rule set against the software project data, summarizing results of evaluating each rule set corresponding to an analysis task and providing a risk assessment value for each analysis task using the results of the summarizing element.

The method can also be implemented as a machine readable medium comprising instructions for execution by a programmable information processing system or as hard coded logic in a specialized computing apparatus such as an application-specific integrated circuit (ASIC). The computer readable medium includes instructions for receiving software project data for assessing risks in a software development project and identifying a plurality of focus areas for analysis. The computer readable medium further includes instructions for defining a set of analysis tasks for each focus area and creating one or more rule sets for each analysis task, each rule set comprising one or more rules including software project data. The computer readable medium further includes instructions for evaluating each rule set against the software project data and summarizing results of evaluating each rule set corresponding to an analysis task. The computer readable medium further includes instructions for providing a risk assessment value for each analysis task using the results of the summarizing element.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 6 is a chart used to specify rules in English language format, in one embodiment of the present invention.

FIG. 7 is a chart used for assigning rule evaluation results to analysis tasks, in one embodiment of the present invention.

FIG. 8 is a chart used for assigning analysis task evaluation results to focus areas, in one embodiment of the present invention.

FIG. 9 is a chart used for assigning focus area evaluation results to the overall software development project, in one embodiment of the present invention.

DETAILED DESCRIPTION

We first describe a system and method for the assessment of risk associated with a software development project. The term "risk" is used to refer to the possibility that a software development project does not meet certain criteria, such as deadlines, production requirements, performance criteria, or any other measurable performance-related facet of a software development project.

Figure 1:
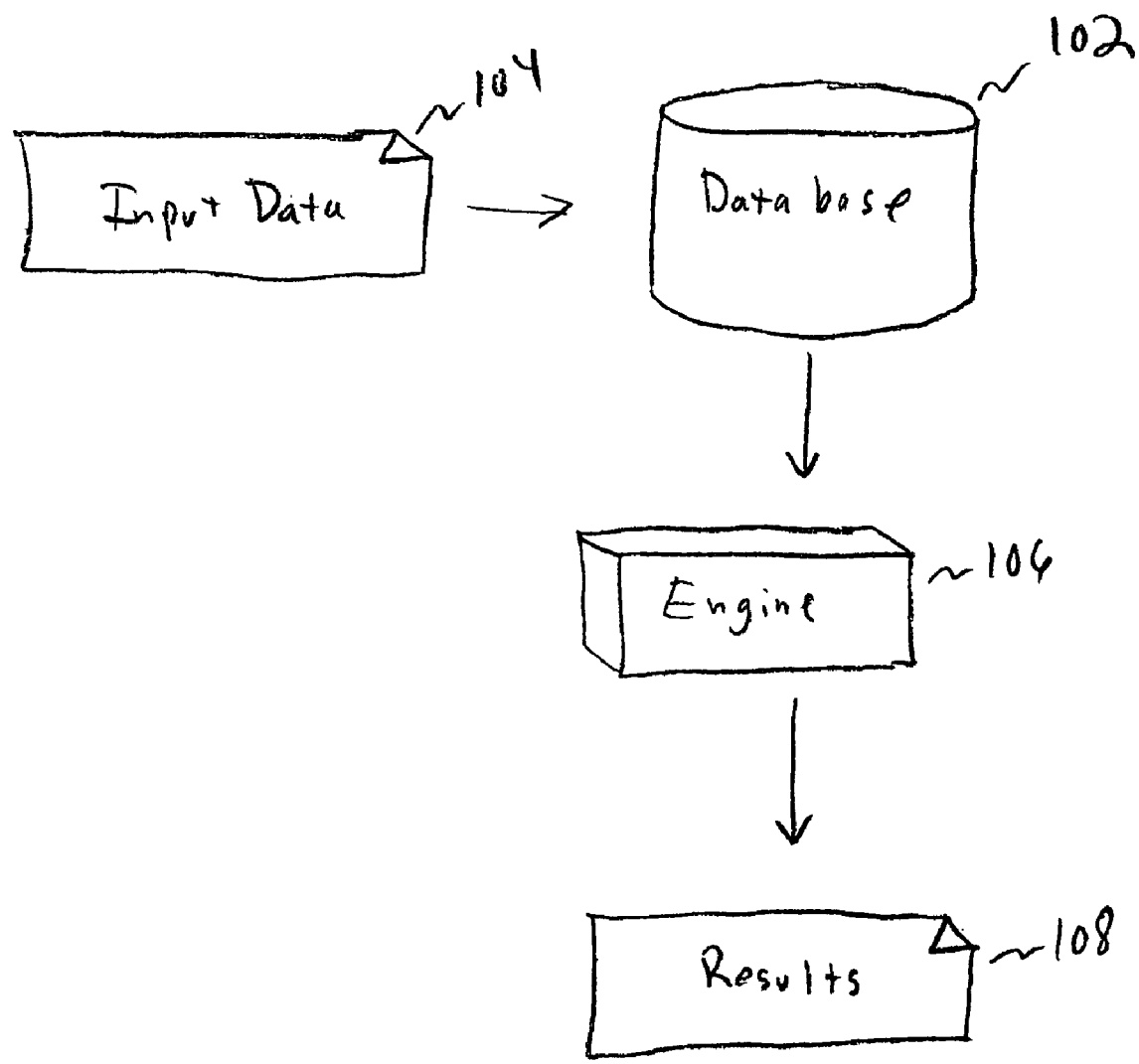
FIG. 1 is a high level block diagram showing the main components of one embodiment of the present invention.

FIG. 1 is a high level block diagram showing the main components of one embodiment of the present invention. FIG. 1 shows a database 102 for storing input data 104 related to the software development project. The database 102 can be any commercially available database managed by a database management system. The input data 104 can be input or received from another computer or from a human user via an interface such as a graphical user interface or a command line interface.

The input data 104 can include software project data relating to the software development project at hand. The software project data can include any of a variety of data related to the software development project, including defect data, test case history data and execution result data. Defect data refers to data relating to a defect in the software development project. Examples of defect data include severity, defect removal activity being performed when found, the environment or condition that existed to expose the defect (i.e., the trigger), the type of defect, the impact of the defect, data on test cases planned, data on test cases executed, data on text cases successful, and size of product (such as lines of code, function points, etc.). Test case history data includes data on the type of the test case, the definition of a test case, the times and dates when a test case was performed, the current status of the data on which the test case was performed, the results of the test case, metadata on the results of a test case, and the development or revisions of a test case. Execution result data refers to the results of executing rules designed to capture risk data of the software development project. The use of rules for this purpose is described in greater detail below.

Input data 104 related to the software development project can also include focus area data, task analysis data, rule data, rule set data, results data or metadata related to any of the previous data. A focus area refers to a general area of involvement for a software development project, such as design stability, code stability, test effectiveness, development effectiveness and support concerns. An analysis task refers to a specific analysis that is conducted to determine risk associated with a particular item of a software development project. An analysis task can include the execution of rules and algorithms, as described in more detail with reference to figures below.

FIG. 1 also includes a risk assessment engine 106. The engine 106 performs risk assessment functions such as the execution of rules and rules sets, as described in more detail with reference to figures below. The engine 106 may also perform other risk assessment functions such as the execution of algorithms and other heuristics designed to assess risk in a software development project.

The present invention provides a method, structure and system for an automated risk assessment system which implements software metrics-based project management using rules and statistical analysis. The invention uses software project data to automatically assess risk and provide feedback. Following is a brief description of the manner in which risk is automatically assessed by the system of the present invention.

A data repository or database contains the raw or input data regarding the software development project under consideration. Focus areas of analysis (such as product stability, test effectiveness, etc.) that will benefit the software development project are defined. Subsequently, a set of analysis tasks for each focus area are defined, identifying the suitable software project data and the appropriate type of analysis. Then, a decision flow diagram for each analysis task is defined, depicting the meaningful conditions resulting in the risk evaluation of each analysis task as high, medium or low risk. Next, textual rule sets are generated in natural language (e.g. English) for each analysis task using the results of the previous steps. The textual rule-sets from the previous step are then converted to a machine readable rule set through the use of a graphical user interface (GUI) builder or a rule set parser.

A data preparation component processes the raw data into the form needed for input into the rule system. In particular, the data preparation component allows for summarization over a specified time frame, merging of individual database queries into a single table, and creation of a time series from the raw data. A rule evaluator evaluates each of the machine readable rules in a rule set for each analysis task against the prepared data and assures the validity of the rules being obeyed or not obeyed. A rule set evaluator summarizes the result of all the rules in a rule-set per analysis task and assigns a single value of risk per analysis task. A risk classifier summarizes the risk for each focus area based on the risks for the individual tasks, resulting in a risk assignment for the focus area. The risk across the various focus areas are summarized for the overall project.

In an embodiment of the present invention, varying methods for summarization of risks associated with individual rule evaluations can be used. Further, associated implication statements for each rule, based on the meaning of analysis tasks, can be generated. Lastly, output in the form of a report in natural language text or other modes of output (e.g. sound) can be performed.

Further, the system of the present invention is implemented using a rules language to carry out steps involving rule execution. The rules language relevant for analyzing the software project data captures risk information. The present invention further incorporates tooling for creating the rules (e.g., a customizable GUI-based rule builder), specification of the rules in the form of statistical algorithms, associating implications with each rule and creating a risk assessment report.

Figure 2:
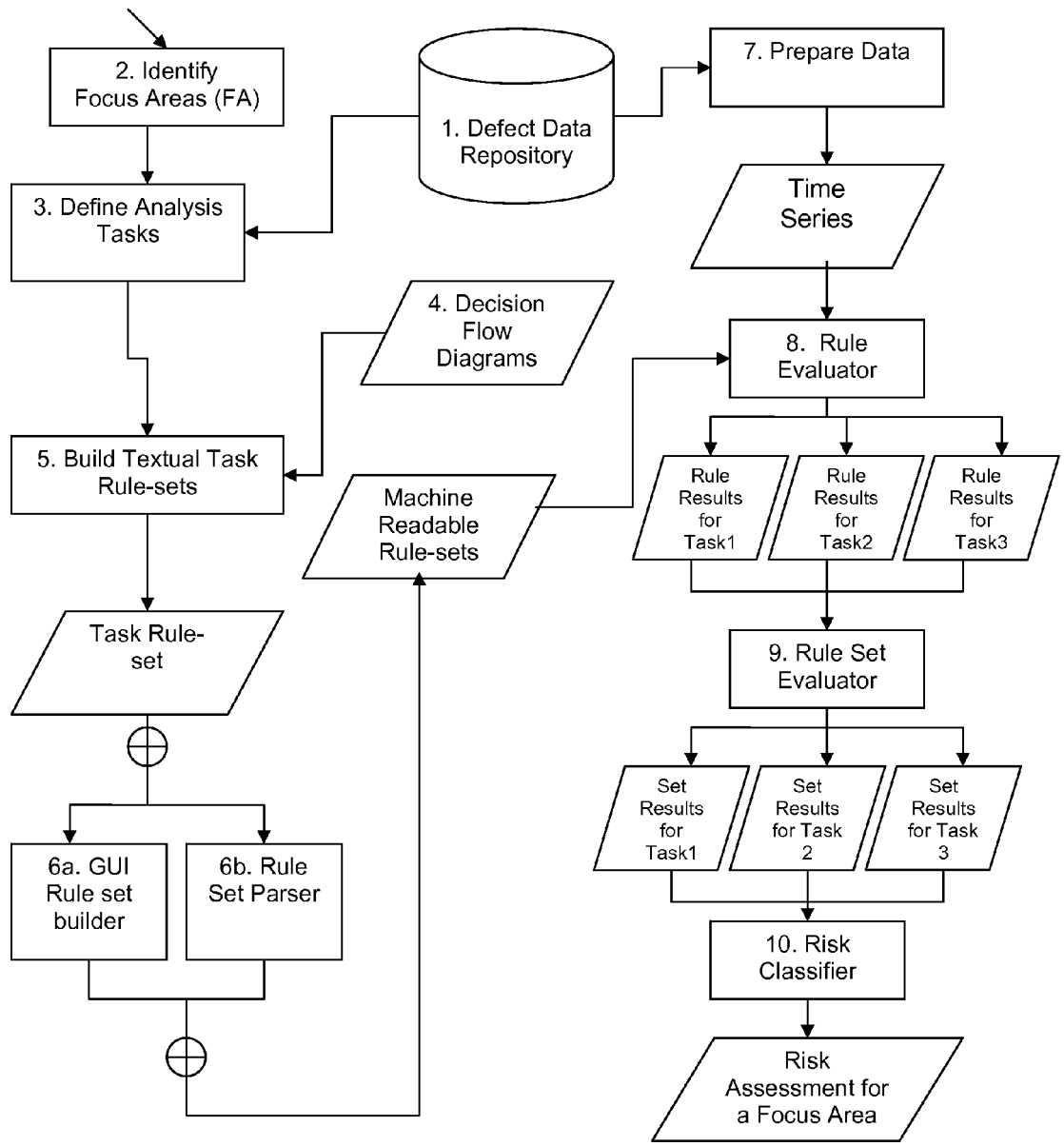
FIG. 2 is a more detailed block diagram showing the control flow of the process of one embodiment of the present invention.

FIG. 2 is a more detailed block diagram showing the control flow of the process of one embodiment of the present invention. FIG. 2 shows the process by which risk in a software development project is automatically assessed using certain input data 104. The control flow of FIG. 2 provides more detail and shows the inner workings of the main components of FIG. 1.

The input data to be used for project assessment is collected in a data repository 202, similar or identical to the database 102 of FIG. 1. Input data 104 can be software project data including any of a variety of data related to the software development project, including defect data, test case history data and execution result data. Input data 104 can also include focus area data, task analysis data, rule data, rule set data, results data or metadata related to any of the previous data.

Next, focus areas for analysis are defined in 204. A focus area refers to a general area of involvement for a software development project, such as design stability, code stability, test effectiveness, development effectiveness and support concerns. Subsequently, analysis tasks are defined in 206 for each focus area. An analysis task refers to a specific analysis that is conducted to determine risk associated with a particular item of a software development project. An analysis task can include the execution of rules and algorithms. The object of an analysis task is to associate software project data from database 202 to the defined focus areas.

Figure 3:
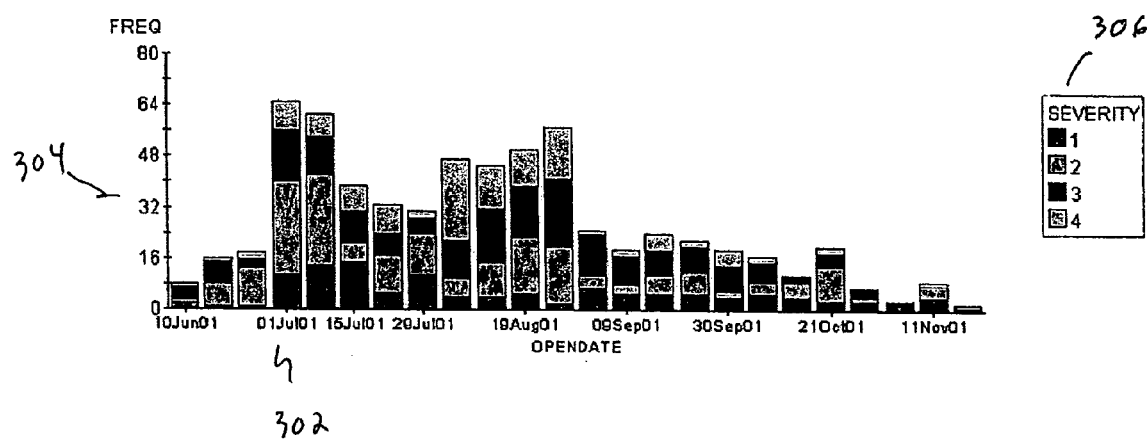
FIG. 3 is a graph used for assessing severity of software defects over time, in one embodiment of the present invention.

FIG. 3 is a graph used for assessing severity of software defects over time, in one embodiment of the present invention. The data shown in the graph of FIG. 3 is typical of the type of software project data that is present in the database 202 and 102. The graph of FIG. 3 shows a bar graph indicating dates or time on the x-axis 302 and frequency of defects on the y-axis 304. There are four levels of increasing defect severity: severity level 1, severity level 2, severity level 3 and severity level 4, as shown by the legend 306. Each bar also shows the percentage of defects of each severity level.

Figures 4, 5:
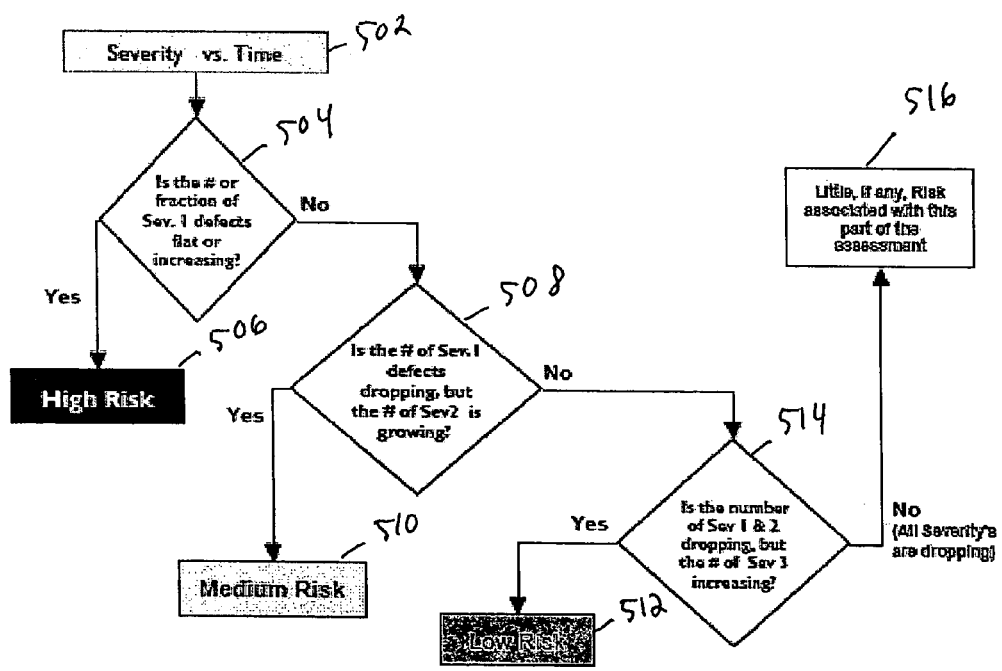
FIG. 4 is a chart used for assigning analysis task definitions to focus areas, in one embodiment of the present invention.
FIG. 5 is a flowchart showing the control flow of the analysis task definition process, in one embodiment of the present invention.

FIG. 4 is a chart used for assigning analysis task definitions to focus areas, in one embodiment of the present invention. FIG. 4 shows that the column 402 shows a list of focus areas. Column 404 includes a list of analysis task definitions for each focus area. For example, the first focus area, Product Stability includes several analysis task definitions, including Defect Type vs. Time, Severity vs. Time, Defect Qualifier vs. Time, Defect Type vs. Qualifier and Intended Defect Type Signature vs. Actual Defect Type Signature.

Returning to FIG. 2, in 218, a decision flow diagram for defining an analysis task is defined. As explained above, an analysis task can be defined, among other things, by a flow diagram representing an algorithm. FIG. 5 is a flowchart showing the control flow of the analysis task definition process, in one embodiment of the present invention. FIG. 5 shows a flow diagram used to assess risk for an analysis task representing severity of a defect over time. There are three levels of increasing severity: severity level 1, severity level 2 and severity level 3. The flow diagram begins with step 502 and proceeds directly to step 504.

In step 504, it is determined whether the number or fraction of severity level 1 defects are flat or increasing over time. If the result of the determination of step 504 is affirmative, then control flows to step 506 which indicates a high risk assessment. If the result of the determination of step 504 is negative, then control flows to step 508.

In step 508, it is determined whether the number of severity level 1 defects are dropping over time but the number of severity level 2 defects are growing. If the result of the determination of step 508 is affirmative, then control flows to step 510 which indicates a medium risk assessment. If the result of the determination of step 508 is negative, then control flows to step 514.

In step 514, it is determined whether the number of severity level 1 and level 2 defects are dropping over time but the number of severity level 3 defects are growing. If the result of the determination of step 514 is affirmative, then control flows to step 512 which indicates a low risk assessment. If the result of the determination of step 514 is negative, then control flows to step 516, which indicates that little if any risk is associated with this part of the risk assessment.

Returning to FIG. 2, in 208, textual rule sets 210 are generated to implement an analysis task specified by software project data and/or an algorithm. A variety of algorithms can be implemented in a rule-based system. One example of an algorithm is a comparison of distributions for determining whether the distribution of one variable across a set of categories matches that of another variable. Another example of an algorithm is a comparison to a constant for determining whether the value of a variable is above/below a specified threshold value. Another example of an algorithm is a comparison to a variable for determining whether the value of one variable is above/below that of another variable. Another example of an algorithm is a trend analysis for determining whether a variable is evolving over time.

Subsequently, the task rule sets 210 are converted to machine readable rule sets 216 through the use of a language, such as a declarative rule language. Such a language expresses rules for the classification of risk. FIG. 6 provides a more detailed example of the declarative rule language. FIG. 6 is a chart used to specify rules in English language format, in one embodiment of the present invention. FIG. 6 shows the name of the rule set in the column 602 and the number of the rule in the column 604. FIG. 6 further shows a severity attribute in column 606 and a unit of measure in column 608. Further shown is a time frame for the rule in column 610, an algorithm type of the rule in column 612, a definition of a condition checked in column 614, a threshold value in column 616 and an associated risk value in column 618.

The rule language makes use of some mathematical concepts that we describe here. A timeseries variable is a variable that takes on different values at different points in time. A timeframe is an interval of time (for example, "last quarter" or "the month of January"). A trend in a timeseries variable is a pattern in its values over some timeframe. For example, a timeseries variable might be considered to be an "increasing" trend if its value increases with respect to time. A sum of a timeseries variable is the sum of its values over a timeframe. For example if a timeseries variable has the value 1 in Jan, 2 in Feb and 3 in Mar, then the sum of that variable over the timeframe Jan-Mar is 6. A percentage of two values (numbers not timeseries) is their ratio multiplied by 100. For example, the percentage of 4 and 5 is 80%.

Take for example rule 23 of FIG. 6.

Rule name: Trend and percent of Severity 2 defects

Precondition: trend(sev2pct, LAST_THREE_QTRS) !=DECREASING OR pct(sum(sev2, LAST_QTR), sum(tvol, LAST_QTR)) >=20

Classification: Risk=Medium

In English, the rule 23 states: If the trend in the percentage of severity 2 defects over the last ¾ of the time periods supplied is not decreasing OR the percentage of the total number of severity 2 defects is >=20, then the risk is medium.

Here, sev2pct is a time series variable representing the percentage of severity 2 defects at each period in the timeframe, and sev2 and tvol represent to the time series containing the number of severity 2 defects and the total number of defects at each period, respectively. Specifics of the proposed rule system are provided below.

First, a rule is a component with three parts: a rule name, a precondition, and a risk classification. The name uniquely identifies the rule in the system. The precondition is a Boolean expression (an expression whose value is either true or false) that represents the condition of the input data necessary for the rule to assert its classification. The risk classification is the assessment of the software project risk asserted by the rule when its precondition is satisfied. Typical risk classifications are: low, medium, or high.

Second, rules are combined into rule sets for a particular analysis task. A rule set is an aggregation of rules which may itself be assigned a risk classification based on the individual classifications of its constituent rules. The method for summarizing the classifications of individual rules into a rule set classification is called a rule set policy.

Third, the preconditions for rules are given as follows:
a) The precondition of a rule can be any Boolean expression using logical operators AND, OR, NOT and the relational operators <, <=, =, >=,>, !=.
b) Terms of the language are either literals (like "true", or "1.5" or "LAST_PERIOD"), time series variables, functions on simple types (like Integer or Boolean), or functions on time series variables.
c) The TimeFrame literals are a set of predetermined relative time frames including: FIRST_HALF, LAST_HALF, LAST_THREE_FOURTHS, LAST_1_PERIOD, LAST_2_PERIODS, LAST_3_PERIODS, LAST_4_PERIODS, SECOND2LAST_PERIOD, THIRD2LAST_PERIOD, FOURTH2LAST_PERIOD, FIFTH2LAST_PERIO, SIXTH2LAST_PERIOD, FIRST_FOURTH, FOURTH2, FOURTH3, LAST_FOURTH, ALL_PERIODS.
d) Statistical functions allowed in the rule include:
   i) trend—returns whether a supplied timeseries and a timeframe over which it is to be evaluated is considered "increasing", "decreasing" or "unchanged".
   ii) sum—returns the sum of the values in a timeseries variable evaluated on a supplied timeframe.
   iii) pct—returns the percentage of two numbers.
   iv) probProportionTest—given a timeseries representing observed values over a given timeframe, and a timeseries representing the total values over that timeframe, returns true only if the percentage of the sum of the observed timeseries to the sum of the totals is above/below a supplied threshold with statistical significance.
   v) linearTrendTest—given a timeseries and a timeframe over which to evaluate the timeseries, returns true only if the supplied timeseries linearly extrapolated a supplied amount of time into the future is above/below a supplied threshold.

Fourth, a typical rule in the language expressed textually might is:
Rule name: Trend and percent of severity 2 defects
Precondition: trend(sev2pct, LAST_THREE_QTRS) !=DECREASING OR pct(sum(sev2, LAST_QTR), sum(tvol, LAST_QTR))>=20
Risk Classification: Risk=Medium Returning to FIG. 2, in 212 and 214, machine readable rule sets 216 are generated by a rule set builder 212 and parsed by a rule set parser 214. The rule set builder 212 can be a Java component that provides functionality for the construction of risk evaluation rules. In this embodiment, the rule set builder 212 component supplies an Application Program Interface (API) that allows other components to programmatically construct risk assessment rules. Each part of a rule is constructed with a different call to the API which returns to the client component a node representing the requested rule part. The constructed parts of a rule may be supplied to additional API calls which create new nodes and link them to the supplied parts. By performing a sequence of such API calls, a client may construct a data structure which represents a full risk assessment rule.

In 220, software project data from database 202 is prepared for inclusion into the rule sets of 216 and results in the time series data 222. The software project data preparation component has varying functions including collecting time-based data from a variety of sources into memory and filtering the data for each source individually to remove bad values and logically unnecessary data for the task being executed. The software project data preparation component further determines a common periodicity for all the software project data based on the task being executed and it summarizes the individual data sets according to the periodicity computed.

The software project data preparation component further merges the data sets into one time-based data set for use by the rule evaluation component. An example is to select all defects having severity=1 and tabulate these for each week represented in the selected data. For the example rule 23 of FIG. 6, the data preparation component queries the data found during test activity Function Test and retrieves the summary information, i.e., percentage of the severity 2 defects over the last ¾ of the time periods available.

The automated rule evaluator, in 224, assesses the validity of each rule in 216 and based on the evaluation being true, assigns risk for each of the rules, resulting in the set of results 226, 227 and 228. For example, for the analysis task dealing with Severity vs. Time, FIG. 6 shows ten rules (20-29) being evaluated. In this case, there are ten evaluations of high, medium, low or informational (i.e. of no consequence) values, resulting in a set of results such as 226, 227 and 228.

The automated rule evaluator, in 230, assesses each rule result 226, 227 and 228 and assigns risk for each of the rule sets, resulting in the set of results 232, 234 and 236. FIG. 7 is a chart used for assigning rule set evaluation results to analysis tasks, in one embodiment of the present invention. FIG. 7 shows that the column 702 shows a list of focus areas. Column 704 includes a list of analysis task definitions for each focus area. Column 706 includes a list of risk evaluations for each analysis task definition. The rule evaluator, in 230, produces the results of all rule set result evaluations within an analysis task and summarizes them into an overall risk for the task, as depicted in column 706 of FIG. 7. For example, for the Severity vs. Time analysis task, a single risk value of Medium is the resulting risk assessment.

Subsequently, the automated risk classifier, in 238, assesses each rule set result 232, 234 and 236 for each analysis task and assigns risk to a corresponding focus area, resulting in a risk assessment 240 for a focus area. FIG. 8 is a chart used for assigning analysis task evaluation results to focus areas, in one embodiment of the present invention. FIG. 8 shows that the column 802 shows a list of focus areas, column 804 includes a list of analysis task definitions for each focus area and column 806 includes a list of risk evaluations for each analysis task definition. The risk classifier, in 238, processes the risk evaluations for each analysis task in column 806 and summarizes them into an overall risk for the focus area, as depicted in column 808 of FIG. 8. For example, for the Product Stability focus area, a single risk value of High is the resulting risk assessment.

Lastly, the risk assessments for each focus area are assessed and a combined risk assessment is provided, resulting in a risk assessment for the overall software development project. FIG. 9 is a chart used for assigning focus area evaluation results to the overall software development project, in one embodiment of the present invention. FIG. 9 shows that the column 902 shows a list of focus areas, column 904 includes a list of analysis task definitions for each focus area, column 906 includes a list of risk evaluations for each analysis task definition and column 908 includes a list of risk assessments for each focus area. The risk assessments for each focus area in column 908 are processed and summarized into an overall risk for the software development project, as depicted in column 910 of FIG. 9.

It should be noted that the order of evaluation of the rules is not important since the rules are independent of each other. The summarization step works to normalize inconsistent risk assessments. The system of the present invention provides functionality for the summarization of risk assessments targeting specific focus areas. The summarization can be accomplished in different ways, such as a "worst case' (most risky) assessment from any of the constituent assessments, which may be assigned as the risk assessment of the aggregate. Another manner of conducting a summarization includes reading the mode, or most frequently made assessment, from any of the constituent assessments and assigning it as the risk assessment of the aggregate. Yet another manner of conducting a summarization includes generating the constituent risk assessments numerically and computing the risk assessment of the aggregate as a weighted sum of the individual risk assessments.

At each level of the risk assessment (analysis task, focus area, or overall project), the evaluation of the risk is accompanied by appropriate implications. For example, an evaluation of risk may be accompanied by a report similar to the following: 1) the volume of severity 1 defects in most recent time periods indicates that the product does not yet appear to be stable, although the potential impacts of these defects on the customer is low; 2) consistent surfacing of severity 1 defects indicates potential product instability, 3) the volume, % or trend of severity 2 defects in most recent time periods indicates there are still too many high severity defects, although the potential impact of these defects on the customer is low and 4) an increase in severity 4 defects relative to severity 3 defects over time is desirable. The report may be presented to the user in the form of text or through another modality such as speech synthesis, or graphical depiction. The report can be output as text with, e.g., color-coding to highlight different risk categories, or issued in the form of a spoken description of the project risk assessment.

It should also be noted that various types of algorithms may underlie the rules. One example of an algorithm is a comparison of distributions wherein two distributions can be compared by simply computing the difference in the percentage of variable values falling into each category for the two different variables, with a difference declared if one or more of these differences is more (or less) than zero or another specified threshold. Alternatively, the data used for analysis can be considered as a random sample from an underlying population, and statistical techniques used to compare the distributions. Different formulations of a Chi-squared goodness-of-fit (GOF) test can be used to compare an observed distribution to a target distribution or to compare one observed distribution to another observed distribution. The statistically based comparison allows for observed variations between distributions that depend on the underlying sample size.

Another example of an algorithm is a comparison to a constant. Comparison to a constant and comparison to a variable algorithms can be accomplished by simply summarizing relevant data and checking whether the summarized variable takes values less than (greater than) a specified constant or another expression. Comparison to a constant can also be framed in a probabilistic context, with statistical techniques used to determine whether the observed data are consistent with a hypothesized threshold value. For instance, a binomial test of proportion is an appropriate way to assess the chance of obtaining the observed percentage of items, assuming that the underlying population contains a specified percentage of these items. A t-test could be used to assess whether the observed sample average of a variable is consistent with a specified average value for the variable in the population. Other statistical methods could also be used, depending on the assumptions imposed on the data.

Another example of an algorithm is a comparison to a variable that allows rules that target changes in volumes or percentages between specified time frames. For instance, rules that focus on the size of the difference in percentage of defects of a certain type between adjacent periods (e.g. every week) can be formulated in this framework.

Yet another example of an algorithm is a trend analysis which is uniquely suited for analysis deployed in managing a software project. The particular challenge of the analysis is the selection of appropriate subset of the data for assessing trends such as the last two months of a six month project. Several alternatives exist for trend analysis, depending on whether it is desired to test for existence of a positive (negative) trend or fit a (linear) trend to observed data, and again depending on data assumptions.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 10:
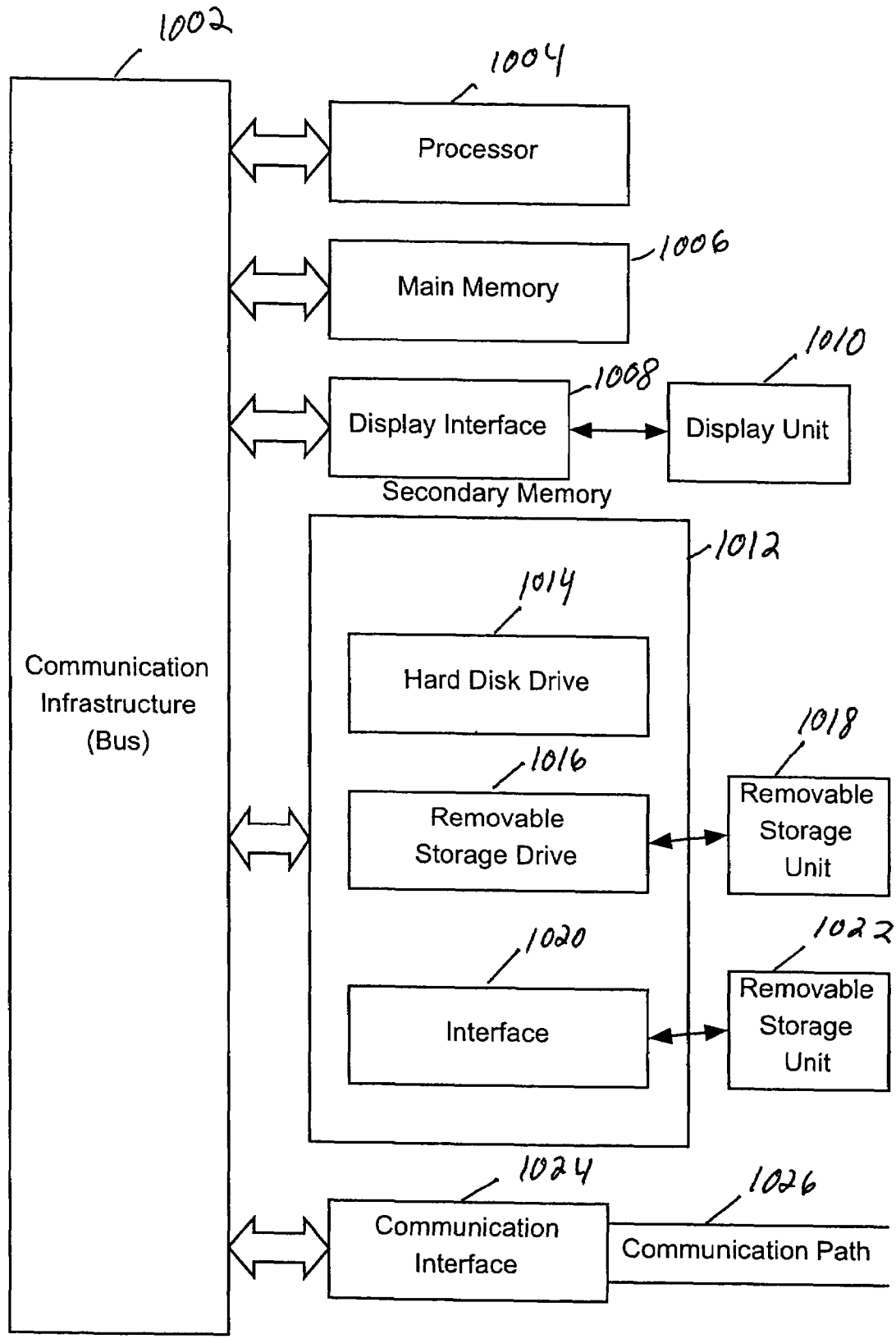
FIG. 10 is a high level block diagram showing an information processing system useful for implementing one embodiment of the present invention.

FIG. 10 is a high level block diagram showing an information processing system useful for implementing one embodiment of the present invention. The computer system includes one or more processors, such as processor 1004. The processor 1004 is connected to a communication infrastructure 1002 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1008 that forwards graphics, text, and other data from the communication infrastructure 1002 (or from a frame buffer not shown) for display on the display unit 1010. The computer system also includes a main memory 1006, preferably random access memory (RAM), and may also include a secondary memory 1012. The secondary memory 1012 may include, for example, a hard disk drive 1014 and/or a removable storage drive 1016, representing a floppy disk drive, a magnetic tape drive, an optical disk drive, etc. The removable storage drive 1016 reads from and/or writes to a removable storage unit 1018 in a manner well known to those having ordinary skill in the art. Removable storage unit 1018, represents a floppy disk, a compact disc, magnetic tape, optical disk, etc. which is read by and written to by removable storage drive 1016. As will be appreciated, the removable storage unit 1018 includes a computer readable medium having stored therein computer software and/or data.

In alternative embodiments, the secondary memory 1012 may include other similar means for allowing computer programs or other instructions to be loaded into the computer system. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to the computer system.

The computer system may also include a communications interface 1024. Communications interface 1024 allows software and data to be transferred between the computer system and external devices. Examples of communications interface 1024 may include a modem, a network interface (such as an Ethernet card), a communications port, a PCMCIA slot and card, etc. Software and data transferred via communications interface 1024 are in the form of signals which may be, for example, electronic, electromagnetic, optical, or other signals capable of being received by communications interface 1024. These signals are provided to communications interface 1024 via a communications path (i.e., channel) 1026. This channel 1026 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1006 and secondary memory 1012, removable storage drive 1016, a hard disk installed in hard disk drive 1014, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1006 and/or secondary memory 1012. Computer programs may also be received via communications interface 1024. Such computer programs, when executed, enable the computer system to perform the features of the present invention as discussed herein. In particular, the computer programs, when executed, enable the processor 1004 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A computer-implemented method for assessing risk of performance of a software development project, the method comprising:
receiving software project data for assessing risks in a software development project, the software project data comprising:
defect data relating to a defect in the software development project,
test case history data comprising data on the type of test case, definition of a test case, times and dates when the test case was performed, current status of data on which the test case was performed, results of the test case, metadata on the results of the test case, and development and revisions of the test case, and execution result data including results of executing rules designed to capture risk data of the software development project;
storing the software project data in a computer storage device;
identifying a plurality of focus areas for analysis;
defining a set of analysis tasks for each focus area;
creating one or more rule sets for each analysis task, each rule set comprising one or more rules including software project data;
evaluating each rule set against the software project data;
summarizing results of evaluating each rule set corresponding to an analysis task; and
providing a risk assessment value for each analysis task using the results of the summarizing step.

2. The method of claim 1 further comprising:
summarizing the risk assessment value for each analysis task corresponding to a focus area; and
providing a risk assessment value for each focus area using results of the summarizing the risk assessment value.

3. The method of claim 2 further comprising:
summarizing the risk assessment value for each focus area; and
providing a risk assessment value for the overall software development project using results of the summarizing the risk assessment value for each focus area.

4. The method of claim 3, the method further comprising: providing a graphical user interface to a user for receiving any one of software project data, focus area data, analysis task data and rules.

5. The method of claim 4, the method further comprising: storing data received from the graphical user interface provided to the user.

6. The method of claim 3, the method further comprising: modifying the software project data for inclusion into the one or more rule sets.

7. The method of claim 3, the method further comprising: creating a computer readable file including the one or more rule sets.

8. An information processing system, comprising:
a memory for storing: software project data for assessing risks in a software development project, where the software project data comprises defect data relating to a defect in the software development project, test case history data comprising data on type of the test case, definition of the test case, times and dates when the test case was performed, current status of data on which the test case was performed, results of the test case, metadata on the results of the test case, and development and revisions of a test case, and execution result data including results of executing rules designed to capture risk data of the software development project;
a plurality of focus areas for analysis;
a set of analysis tasks for each focus area; and
one or more rule sets for each analysis task, each rule set comprising one or more rules including software project data, and a processor configured for:
evaluating each rule set against the software project data;
summarizing results of evaluating each rule set corresponding to an analysis task; and
providing a risk assessment value for each analysis task using the results of the summarizing element.

9. The information processing system of claim 8, wherein the processor is further configured for:
summarizing the risk assessment value for each analysis task corresponding to a focus area; and
providing a risk assessment value for each focus area using the results of the summarizing the risk assessment value for each analysis task corresponding to a focus area.

10. The information processing system of claim 9, wherein the processor is further configured for: summarizing the risk assessment value for each focus area; and providing a risk assessment value for the overall software development project using the results of the summarizing the risk assessment value for each focus area.

11. The information processing system of claim 10, further comprising: a graphical user interface for receiving from a user any one of software project data, focus area data, analysis task data and rules.

12. The information processing system of claim 10, wherein the memory is further configured for storing: data received from the graphical user interface.

13. The information processing system of claim 10, further comprising: a computer readable file including the one or more rule sets.

14. The information processing system of claim 10, wherein the processor comprises an application specific integrated circuit.

15. The information processing system of claim 10, further comprising a memory for storing instructions for: receiving software project data for assessing risks in a software development project; identifying a plurality of focus areas for analysis;
defining a set of analysis tasks for each focus area;
creating one or more rule sets for each analysis task, each rule set comprising one or more rules including software project data; evaluating each rule set against the software project data; summarizing results of evaluating each rule set corresponding to an analysis task; and
providing a risk assessment value for each analysis task using the results of the summarizing element.

16. The information processing system of claim 10, wherein the memory comprises a read-only memory.

17. The information processing system of claim 10, wherein the memory comprises a random-access memory.

18. The information processing system of claim 10, wherein a software project data refers to any one of defect data, test case history data and execution result data.

19. The information processing system of claim 18, wherein defect data refers to a metric associated with a metric value referring to any one of the following data: severity, defect removal activity, condition that exposed the defect, type of defect, impact of defect, data on test cases planned, test cases executed, test cases successful, size of product.

20. The information processing system of claim 10, wherein a focus area refers to any one of design stability, code stability, test effectiveness, development effectiveness and support concerns.

21. The information processing system of claim 10, wherein a rule comprises a precondition, input data and a risk assessment value.

22. The information processing system of claim 21, wherein a precondition is a Boolean expression for evaluation of input data.

23. The information processing system of claim 21, wherein a precondition is a Boolean expression whose logical operators include: AND, OR, and NOT and whose non-logical operators include the relational operators: less than, less than or equal to, equal to, greater than, greater than or equal to, and identical to.

24. The information processing system of claim 21, wherein a precondition is a Boolean expression whose terms include statistical functions for evaluation upon input data.

25. The information processing system of claim 21, wherein evaluation of a rule comprises: evaluating the precondition of the rule; and generating a result equal to the risk assessment value of the rule.

26. A computer readable storage medium including computer instructions for:
receiving software project data for assessing risks in a software development project; identifying a plurality of focus areas for analysis, the software project data comprising defect data relating to a defect in the software development project, test case history data comprising: data on type of the test case, definition of the test case, times and dates when the test case was performed, current status of data on which the test case was performed, results of the test case, metadata on the results of the test case, and development and revisions of the test case, and execution result data including results of executing rules designed to capture risk data of the software development project;
defining a set of analysis tasks for each focus area;
creating one or more rule sets for each analysis task, each rule set comprising one or more rules including software project data;
evaluating each rule set against the software project data;
summarizing results of evaluating each rule set corresponding to an analysis task; and
providing a risk assessment value for each analysis task using the results of the summarizing instruction.

27. The computer readable storage medium of claim 26, further comprising instructions for: summarizing the risk assessment value for each analysis task corresponding to a focus area; and providing a risk assessment value for each focus area using the results of the second summarizing instruction.

28. The computer readable storage medium of claim 27, further comprising instructions for: summarizing the risk assessment value for each focus area; and providing a risk assessment value for the overall software development project using the results of the third summarizing instruction.

29. The computer readable storage medium of claim 28, further comprising instructions for: modifying the software project data for inclusion into the one or more rule sets.

30. The computer readable storage medium of claim 28, further comprising instructions for: creating a computer readable file including the one or more rule sets.

* * * * *

UNITED STATES PATENT AND TRADEMARK OFFICE
CERTIFICATE OF CORRECTION

PATENT NO. : 7,669,180 B2
APPLICATION NO. : 10/872282
DATED : February 23, 2010
INVENTOR(S) : Bassin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1650 days.

Signed and Sealed this

Seventh Day of December, 2010

David J. Kappos
*Director of the United States Patent and Trademark Office*